US009936013B2

(12) United States Patent
Mu et al.

(10) Patent No.: US 9,936,013 B2
(45) Date of Patent: Apr. 3, 2018

(54) TECHNIQUES FOR CONTROLLING CLIENT TRAFFIC ON A CLUSTERED SYSTEM

(71) Applicant: NETAPP, INC., Sunnyvale, CA (US)

(72) Inventors: Paul Yuedong Mu, Sunnyvale, CA (US); Desai Rajesh, Sunnyvale, CA (US); Abhishek Naidu, Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 445 days.

(21) Appl. No.: 14/526,760

(22) Filed: Oct. 29, 2014

(65) Prior Publication Data
US 2016/0127462 A1    May 5, 2016

(51) Int. Cl.
*H04L 29/08*        (2006.01)

(52) U.S. Cl.
CPC ...... *H04L 67/1095* (2013.01); *H04L 67/1097* (2013.01)

(58) Field of Classification Search
CPC .................... H04L 67/1095; H04L 67/1097
See application file for complete search history.

(56) References Cited

U.S. PATENT DOCUMENTS

| | | | | |
|---|---|---|---|---|
| 8,150,805 B1* | 4/2012 | Tawri | ............... | G06F 21/6218 707/610 |
| 8,332,354 B1* | 12/2012 | Chatterjee | ........... | G06F 11/1461 707/624 |
| 9,268,811 B1* | 2/2016 | Thakur | ............. | G06F 17/30575 |
| 2006/0179261 A1* | 8/2006 | Rajan | ............... | G06F 17/30067 711/162 |
| 2008/0177963 A1* | 7/2008 | Rogers | ............... | G06F 11/2071 711/162 |
| 2013/0275694 A1* | 10/2013 | Gao | ........................ | G06F 5/06 711/162 |
| 2014/0032957 A1* | 1/2014 | Beeston | ............. | G06F 11/2097 714/2 |
| 2016/0077917 A1* | 3/2016 | Battepati | ............. | G06F 11/1407 714/15 |

* cited by examiner

*Primary Examiner* — Brian J. Gillis
*Assistant Examiner* — Gil H. Lee
(74) *Attorney, Agent, or Firm* — Cooper Legal Group, LLC

(57) ABSTRACT

Various embodiments are generally directed to an apparatus and method to receive client traffic comprising information at a primary cluster of a clustered system over a communications link, perform, a replication operation on the clustered system to replicate the information on a secondary cluster of the clustered system, and determine a client traffic throughput for the client traffic and a replication throughput for the replication operation. In some embodiments, the apparatus and method may include buffering one or more write operations to control the client traffic such that the client traffic throughput is less than or equal to the replication throughput for the replication operation.

20 Claims, 12 Drawing Sheets

600

- RECEIVE CLIENT TRAFFIC COMPRISING INFORMATION AT A PRIMARY CLUSTER OF A CLUSTERED SYSTEM OVER A COMMUNICATIONS LINK
  *605*

- PERFORM A REPLICATION OPERATION ON THE CLUSTERED SYSTEM TO REPLICATE THE INFORMATION ON A SECONDARY CLUSTER OF THE CLUSTERED SYSTEM
  *610*

- DETERMINE A CLIENT TRAFFIC THROUGHPUT FOR THE CLIENT TRAFFIC AND A REPLICATION THROUGHPUT FOR THE REPLICATION OPERATION
  *615*

- BUFFER ONE OR MORE WRITE OPERATIONS TO CONTROL THE CLIENT TRAFFIC SUCH THAT THE CLIENT TRAFFIC THROUGHPUT IS LESS THAN OR EQUAL TO THE REPLICATION THROUGHPUT FOR THE REPLICATION OPERATION
  *620*

*FIG. 6*

TECHNIQUES FOR CONTROLLING CLIENT TRAFFIC ON A CLUSTERED SYSTEM

TECHNICAL FIELD

Embodiments described herein generally relate to resynchronizing storage clusters on a clustered system.

BACKGROUND

Clustered storage systems may store and provide information to one or more computing systems in a network, such as a storage area network (SAN). More specifically, a computing system may write information to a storage system and read information from the storage system over one or more communication links. These clustered storage systems may include storage devices, such as disks, in an array to store the information.

The information stored on the clustered storage systems may be critical and important to clients utilizing the clustered storage system. Thus, the clustered storage systems may provide backup services to the clients. More specifically, a backup or a copy of the information may be stored on the clustered storage system and in some instances on separate storage devices than where the original information is stored. However, in some instances, information may become out of sync on the clustered system including when an error or failure occurs.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 6 illustrates an embodiment of a second logic flow diagram.

DETAILED DESCRIPTION

Figure 1A:
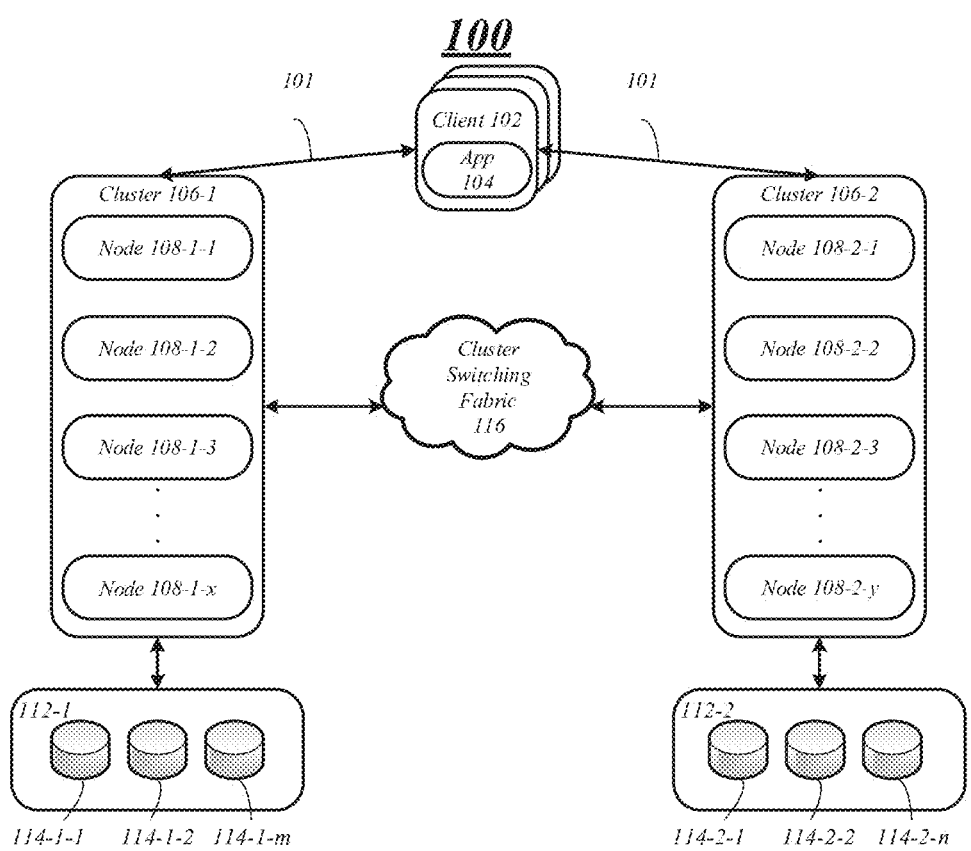
FIG. 1A illustrates an embodiment of a storage computing system.

Various embodiments are directed to systems, devices, apparatuses, methods and so forth to provide synchronous data replication services and processing client traffic from one or more client devices. More specifically, various embodiments may include a clustered system to receive client traffic including information, data and read/write instruction from one or more client devices. The client devices may store and retrieve information and at data on the clustered system. For example, client devices may send information, such as financial data, statistical data, advertising data, personal data, company data, or any other data for storage on the clustered system. The client devices may read or retrieve the information from the clustered system. Various embodiments are not limited in this manner and the clustered may provide other services and processing capabilities to the client devices.

In some embodiments, the clustered system may provide data redundancy and replication services to the client devices. For example, the client traffic sent to the clustered system may be stored on storage devices associated with a primary cluster and a replication of the client traffic may be stored on storage devices associated with a secondary cluster. In some embodiments, the client traffic may be replicated on the clustered system either synchronously or semi-synchronously based on a configuration for the client traffic. When configured for synchronous replication, the client traffic and a replication of the client traffic may be stored on the primary cluster and secondary cluster in parallel, simultaneously or concurrently. However, when configured for semi-synchronous replication or resynchronization the client traffic may be stored on the primary cluster, and the replication may be stored on the secondary cluster at some later point in time.

Various embodiments may also be directed to monitoring and controlling various aspect of the replication process. For example, various component and modules of the clustered system may monitor and control client traffic throughput and replication throughput. In some embodiments, the clustered system may throttle or suspend the writing of the client traffic to the primary cluster to ensure that the replication is being processed in a timely manner on the secondary cluster. For example and in some embodiments, write operation may be stored in a buffer and the output of the buffer may be controlled such that that replication throughput is equal to or greater than the client traffic throughput. Various embodiments are not limited in this manner and these and other details are further discussed in the following description.

Various embodiments also relate to apparatus or systems for performing these operations. This apparatus may be specially constructed for the required purpose or it may include a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1A illustrates a general overview of a clustered system 100 including a first cluster 106-1 having one or more nodes 108-1-x configured to provide processing and storage services to a plurality of storage devices 114-1-m of a storage array 112-1, where x and m may be any positive integer. The clustered system 100 may also include a second cluster 106-2 having a plurality of nodes 108-2-y also coupled with a plurality of storage devices 114-2-n of a storage array 112-2, where y and n may be any positive integer. Further, FIG. 1A illustrates one or more clients 102 coupled with clusters 106-1 and 106-2 through one or more communication links 101. In some embodiments, the one or more communication links 101 may include any type of wired or wireless connection or combination thereof. The clients 102 may communicate any type of information to the clusters 106-1 and 106-2 for storage on one or more storage devices 114-1 and 114-2 in a storage array 112 over the one or more communication links 101.

The clustered system 100 may replicate information and be configured to provide failover and backup capabilities for the clients 102. In some embodiments, the first cluster 106-1 may be considered a primary cluster and the second cluster 106-2 may be considered a secondary cluster. Moreover, the clients 102 may communicate information with first cluster 106-1 as a primary cluster and a replication or copy of the information may be communicated between the first cluster 106-1 and the second clustered system 106-2 via the cluster switching fabric 116 to provide data redundancy and the failover and backup capabilities.

For example, if an error or a failover event occurs on the clustered system 100, the clients 102 may switch from communicating with the first cluster 106-1 to communicate with the second cluster 106-2. Since the information is replicated on the second cluster 106-2, the switching between the cluster 106-1 and cluster 106-2 occurs transparently and seamlessly to the clients 102. In addition, various embodiments are not limited to switching from the first cluster 106-1 to the second cluster 106-2 and switching may occur in either direction. For example, the client 102 may switch back and communicate information with the first cluster 106-1 once the error or failure event has been resolved. In the same or other embodiments, the second cluster 106-2 may be operating as the primary cluster and the client 102 may switch and communicate with the first cluster 106-1 during a failure event. Various embodiments are not limited in this manner.

Clients 102 may communicate any type of information to be stored on the clustered system and may be any type of computing device having a plurality of components. These components may include a central processing unit (CPU), main memory, I/O devices, and storage devices (for example, flash memory, hard drives and others). The main memory may be coupled to the CPU via a system bus or a local memory bus. The main memory may be used to provide the CPU access to data and/or program information that is stored in main memory at execution time. Typically, the main memory is composed of random access memory (RAM) circuits. A computer system with the CPU and main memory is often referred to as a host system.

Client 102 may be configured to interact with nodes 108 of the clusters 106 in accordance with a client/server model of information delivery. That is, a client 102 may request the services of a node 108, and the node 108 may return the results of the services requested by the client 102 over a network including one or more communication links 101. Clients 102 may be configured to execute processor executable instructions, shown as application(s) 104 for reading and writing information on the clustered system 100. Such application(s) 104 may include a database application, a financial management system, an electronic mail application or any other application type.

The information communicated between the clients 102 and the clusters 106 may be considered client traffic which may include data and read and write requests. Moreover, the clients 102 may communicate read requests to retrieve information from the clusters and write requests to store information on the clusters 106. The client traffic may be communicated over any type of one or more communication links 101 including an Ethernet network, a Fibre Channel (FC) network or any other network type. Moreover, the nodes 108 may be interconnected by a cluster switching fabric 116 which may be embodied as a Gigabit Ethernet switch or any other interconnect type.

Further, the clients 102 may issue packets to communicate the client traffic using application(s) 104 including file-based access protocols, such as the Common Internet File System ("CIFS") protocol or the Network File System ("NFS") protocol, over the Transmission Control Protocol/Internet Protocol ("TCP/IP") when accessing information in the form of certain data containers. Alternatively, the clients 102 may issue packets to communicate the client traffic using application(s) 104 including block-based access protocols, such as the Small Computer Systems Interface ("SCSI") protocol encapsulated over TCP ("iSCSI") and SCSI encapsulated over Fibre Channel ("FCP"), when accessing information in the form of other data containers, such as blocks.

In various embodiments a node 108 may be any type of computing device and may include any number of functional components that cooperate to provide distributed storage system architecture for the clients 102. Each node 108 is generally organized as a network element and a storage device element. The network element may include functionality that enables nodes 108 to connect to the clients 102 over one or more communication links 101, while each storage device element connects to one or more storage devices 114 or a storage array 112 having a plurality of storage devices 114. Further and as will be discussed in more detail below nodes 108 may include other functional components for providing backup and failover capabilities and to ensure synchronization of information on the clustered system.

Each of the clusters 106-1 and 106-2 including the nodes 108 may be coupled with or include a storage array 112-1 and 112-2 having one or more storage devices 114. The storage arrays 112-1 and 112-2 may include a number of elements and components to provide storage services to the clients 102. More specifically, the storage arrays 112 may implement a high-level module, such as a file system or write anywhere file layout (WAFL), to logically organize the information as a hierarchical structure of directories or files and may have a data structure such as logical units identified by a logic unit number (LUN) on the storages devices 114.

In various embodiments, the LUN may be a unique identifier used to designate individual or collections of hard disk devices for address by a protocol associated with a SCSI, iSCSI, Fibre Channel (FC), and so forth. Logical units are central to the management of block storage arrays shared over a storage area network (SAN). Each LUN identifies a specific logical unit, which may be a part of a hard disk drive, an entire hard disk or several hard disks in a storage device 114, for example. As such, a LUN could reference an entire RAID set, a single disk or partition, or multiple hard disks or partitions. The logical unit is treated as if it is a single device and is identified by the LUN.

Figure 1B:
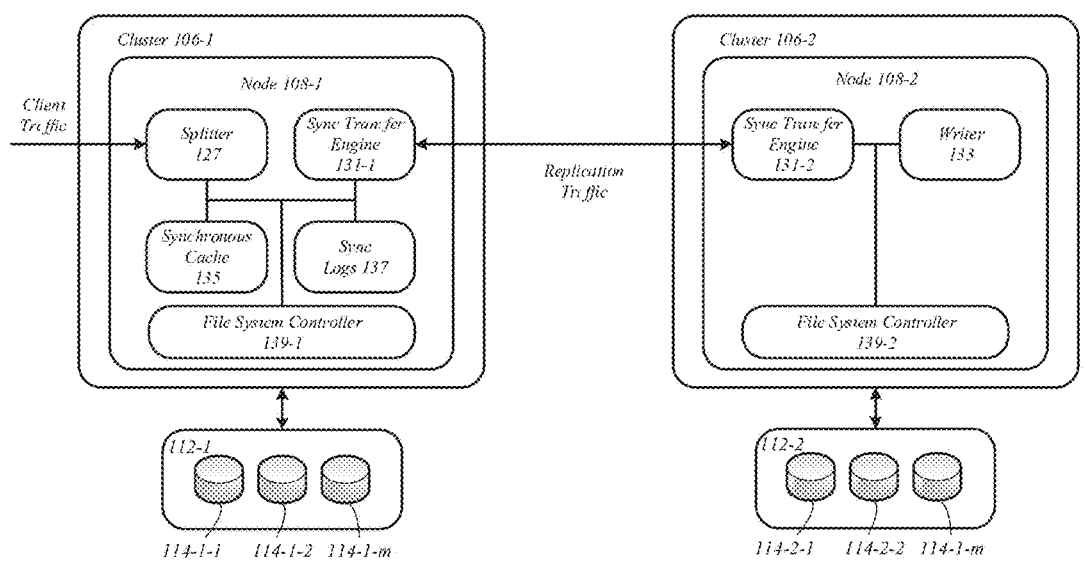
FIG. 1B illustrates a second embodiment of a storage computing system.

FIG. 1B illustrates an embodiment of a storage computing system 125 for providing replication capabilities in a clustered system environment. FIG. 1B illustrates cluster 106-1 having node 108-1 and cluster 106-2 having node 108-2. Various embodiments are not limited in this manner and FIG. 1B only shows each cluster having one node for illustrative purposes only. As discussed above with respect to FIG. 1A, each of the clusters 106-1 and 106-2 may have any number of nodes 108.

Further and as similarly discussed above, cluster 106-1 and cluster 106-2 may provide replication of data, failure capabilities and backup services. FIG. 1B shows, cluster 106-1 operating as a primary cluster and cluster 106-2 operating as a secondary cluster where client traffic is received by cluster 106-1 and replicated on cluster 106-2. However, cluster 106-1 and cluster 106-2 are not limited in this manner and at certain times, such as when a failure event occurs, cluster 106-2 may be the primary cluster and cluster 106-1 may be the secondary cluster. In this example, cluster 106-2 may receive the client traffic from clients and replication traffic may be communicated from cluster 106-2 to cluster 106-1.

Moreover, FIG. 1B illustrates one configuration where cluster 106-1 includes node 108-1 having components for receiving information from a client and processing the information as part of cluster 106-1 operating as a primary cluster. When node 108-1 is operating in a primary cluster, it may include a splitter 127, a sync transfer engine 131-1, a synchronous cache 135, sync logs 137 and a file system controller 139-1. Node 108-2 is illustrated as having components for processing information as part of cluster 106-2 operating as a secondary cluster and includes a sync transfer engine 131-2, a writer 133 and a file system controller 139-2. Any node operating in a primary cluster may include components illustrated in node 108-1 and any node operating in a secondary cluster may include components illustrated in node 108-2. When the clusters 106-1 and 106-2 switch operating roles, the components illustrated operating on the nodes of cluster 106-1 may operate on nodes of cluster 106-2, and vice versa. However, for discussion purposes only FIG. 1B is discussed with cluster 106-1 operating as the primary cluster and cluster 106-2 operating as the secondary cluster. Further, nodes 108-1 and 108-2 may include additional components and processing modules to process information and data.

In various embodiments, node 108-1 may include the splitter 127 which may receive and process client traffic from one or more clients. Generally, the splitter 127 may process the client traffic by sending it for storage on storage devices associated with the primary cluster and the secondary cluster. In some embodiments, the splitter 127 may send the client traffic including information and write instructions to storage devices associated with the primary cluster as one or more file system messages. Further, the splitter 127 may also send a copy of the information to a secondary cluster in one or more packets. Various embodiments are not limited in that manner.

When processing the client traffic, the splitter 127 may determine whether the client traffic is to be replicated synchronously or semi-synchronously, and process the client traffic. For example, the splitter 127 may read information from storage devices 114 associated with primary cluster and provide the information to the clients when processing read requests. In another example, the splitter 127 may send information to the storage devices 114 associated with the primary cluster and a replication of the information to storage devices 114 associated with the secondary cluster when processing write requests. Various embodiments, are not limited in this manner.

Further and when processing write requests, the splitter 127 may determine if the client traffic is associated with a workload that is to be replicated synchronously or semi-synchronously by reading information stored in synchronous cache 135. If the client traffic is to be replicated synchronously, the splitter 127 may send the information to storage devices 114 associated with both the primary cluster and the secondary cluster in parallel or in a synchronous manner. More specifically, the splitter 127 may send the original information to the storage devices 114-1 associated with the primary cluster and may send a copy or replication of the information to storage devices 114-2 associated with the secondary cluster at the same time or nearly the same time.

However if the client traffic is to be replicated semi-synchronously or a resynchronization is occurring, the splitter 127 may first send the information to storage devices 114-1 associated with the primary cluster and then send a copy or replication of the information to the secondary cluster at some later point in time. The splitter 127 may log an indication of various regions of a data structure on storage devices 114-1 of the primary cluster having the new information in a dirty region log 154 illustrated in FIG. 1C. The splitter 127 may use the dirty region log 154 when performing a replication operation and resynchronization to copy the information from the primary cluster to send to the secondary cluster on a periodic or semi-periodic basis. For example, the splitter 127 may read the dirty region log 154, determine which regions of the data structure on the primary cluster have new information, and copy the new information from the data structure on the primary cluster to a corresponding data structure on the secondary cluster.

Moreover, the replication operation may be performed periodically or semi-periodically based on a user configuration or user setting such as a recovery point objective (RPO) for semi-synchronous replication. An RPO may be an amount of time in which information for a workload may be lost if the file system becomes corrupted, data is lost, or a failure occurs and may be determined by a system administrator, a user or client of the system, or by the system itself. Thus, workloads having a higher RPO may perform replication operations more frequently then workloads having a lower RPO. For semi-synchronous replication, a schedule to run a replication operation may be determined for each workload based on an RPO.

For both synchronous and semi-synchronous replications and resynchronization, the splitter 127 may monitor and control the replication throughput for the replication traffic, e.g. a copy of the information, and client traffic throughput for the client traffic, e.g. information. The splitter 127 may ensure that the replication throughput greater or equal to the client traffic throughput (or client traffic throughput is less than or equal to replication throughput). If the replication throughput falls behind the client traffic throughput information may be lost for the case of synchronous replication or the RPO may not be met for semi-synchronous replications. For example, if the client traffic throughput is greater than the replication traffic throughput for a given workload, the splitter 127 may throttle or slow the writing of the client traffic on the primary cluster to slow the client traffic throughput.

In another example, the clustered system 100 may perform a resynchronization if a failure event occurs, such as a software failure, hardware failure, network failure, etc.

Similar to a replication operation, information may be copied from primary cluster to the secondary cluster during a resynchronization operation to ensure both clusters and storage devices are synchronized. The information copied from the primary cluster to the secondary cluster may be copied based on information in the inflight tracker log 152 and the dirty region log 154. In addition and when copying the information from the primary cluster to the secondary cluster, the splitter 127 may control the client traffic throughput for incoming client traffic and the replication. If the incoming client traffic throughput is greater than the replication throughput during a resynchronization, the splitter 127 may throttle or slow the writing of the client traffic on the primary cluster. Various embodiments are not limited in this manner.

Figure 1C:
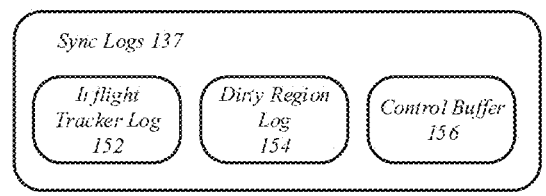
FIG. 1C illustrates an embodiment of sync logs.

In some embodiments, the splitter 127 may control client traffic and client traffic throughput by utilizing a buffer, such as the control buffer 156 illustrated in FIG. 1C. The splitter 127 may send the information for storage on the primary cluster to a buffer and control the output rate of the buffer such that the client traffic throughput is equal to or less than the replication throughput (or replication throughput is greater than or equal to the client traffic throughput). For example, if the client traffic throughput is 100 Megabytes per Second (MB/s) and the replication throughput is 50 MB/s, the splitter 127 may control the client traffic throughput by temporarily storing the information including write instructions in a buffer, and controlling the output rate of the information and write instructions from the buffer to storage devices 114 associated with the primary cluster at 50 MB/s for this example. In some embodiments, if the buffer receives too much information it may overflow and information may be lost. Thus, the splitter 127 may also communicate with one or more clients to slow down the incoming client traffic. Various embodiments are not limited in this manner.

As mentioned, the node 108-1 of the primary cluster may include a synchronous cache 135 to store information for workloads, such as whether the workload is replicated synchronously or semi-synchronously. Further, the synchronous cache 135 may also store the replication throughput for a workload which may be retrieved by the splitter 127 to compare with the client traffic throughput and used to make adjustments. In some embodiments, the replication throughput for a workload may be calculated by the sync transfer engine 131-1 in real-time as the replication traffic is communicated to the secondary cluster. The replication throughput may be a moving average for processing an amount of data or information for the replication traffic over time and may be in units such as MB/s, kilobytes/second (KB/s), bytes/second (B/s), and so forth.

Similarly, the client traffic throughput may be calculated by the splitter 127 in real-time and may be the moving average for processing an amount of data or information for the client traffic over time. The client traffic throughput may be in units of MB/s, KB/s, B/s, and so forth. In some embodiments, the file system controller 139-1 may calculate the client traffic throughput as the client traffic is being written to the storage devices 114 associated with the primary cluster. Various embodiments are not limited in this manner.

In some embodiments, node 108-1 may include a file system controller 139-1 which may interface with storage array 112-1 and storage devices 114-1 and control read and write operations. In some embodiments, file system controller 139-1 may receive information include read and write instructions from the splitter 127 in one or more file system messages, such as WAFL messages. The file system controller 139-1 may process the information including the read and write instructions by either reading information or writing information for storage on the storage devices 114-1 of the storage array 112-1.

In some embodiments, the file system controller 139-1 may also monitor and control client traffic throughput, either as an alternative or in conjunction with the splitter 127. For example, the file system controller 139-1 may monitor the client traffic throughput as it writes or send the client traffic to the storage array 112-1. The file system controller 139-1 may also monitor and/or receive the replication throughput from the splitter 127 or another component of the cluster 106-1. As similarly discussed above, the file system controller 139-1 may ensure that the client traffic throughput is less than or equal to the replication throughput (or that the replication throughput is greater than or equal to the client traffic throughput).

In some embodiments, the file system controller 139-1 may control the client traffic and client traffic throughput in a similar manner as discussed above by using a buffer, such as control buffer 156. For example, the file system controller 139-1 may receive one or more messages, such as WAFL messages, from the splitter 127 to process client traffic. The file system controller 139-1 may suspend write operations for client traffic by putting the write operations in the buffer for a period of time to slow the write operations for the client traffic. Moreover, the file system controller 139-1 may control the output of the write operations in the buffer such that the client traffic throughput is less than or equal to the replication throughput. Various embodiments are not limited in this manner and other means for control client traffic throughput may also be contemplated.

Node 108-1 on the primary cluster may also include other components, such as the sync transfer engine 131-1. As previously discussed, the sync transfer engine 131-1 may be used communicate information between nodes of the clustered, such as a replication of the information for storage on a secondary cluster. The sync transfer engine 131-1 may also be used to communicate other information, such as status messages, confirmation messages, and so forth.

The sync transfer engine 131-1 may communicate information of any communication link, such as cluster switching fabric, as one or more packets. In some embodiments, the sync transfer engine 131-1 may determine or calculate a replication throughput for communicate replication of information to a node of a secondary cluster. The sync transfer engine 131-1 may calculate the replication throughput as the amount of information communicate over time in GB/s, MB/s, KB/s and so forth. Various embodiments are not limited in this manner.

The clustered system 125, and in particular, a node of a secondary cluster, such as cluster 106-2 in this embodiment may include a sync transfer engine 131-2, a writer 133 and a file system controller 139-2. The sync transfer engine 131-2 may be similar to the sync transfer engine 131-1 discussed above. For example, the sync transfer engine 131-2 may communicate information between nodes 108-2 and 108-1 on the clustered system 125. Similarly, file system controller 139-2 may operate the same as or similarly to file system controller 139-1. For example, file system controller 139-2 may process read and write instructions on node 108-2 for storing information on storage array 112-2.

In various embodiments, the node 108-2 may include the writer 133 which may be capable to communicate information between the sync transfer engine 131-2 and the file system controller 139-2. In some embodiments, the writer 133 may communicate information to the file system controller 139-2 as one or more file system messages, such as WAFL messages, for example. In various embodiments, the writer 133 may communicate information including a copy of information stored on a primary cluster, read/write instructions and other information. Various embodiments are not limited in this manner and the writer 133 may perform other processing capabilities.

FIG. 1C illustrates an exemplary embodiment of sync logs 137 including an inflight tracker log 152, a dirty region log 154 and a control buffer 156. The inflight tracker log 152 may store inflight tracker log information and the dirty region log 154 may store dirty region log information. The inflight tracker log information may record any incoming writes from one or more clients that have not been fully committed or written on a clustered system. Moreover, the inflight tracker log information may log the incoming writes when the write is first received by the clustered system. This is to ensure that if a relationship falls out of sync between clusters, such as a primary cluster and secondary cluster, the regions corresponding to the writes can be brought back into sync, i.e. resynced. Once information relating to the write instruction for information has been stored on both sides it is no longer considered inflight information and that region can be cleared in the inflight tracker log 152.

The inflight tracker log 152 may be a file stored in cache in random access memory, or on a persistent storage device such as a hard drive and may indicate each region having inflight information to be written in. In some embodiments, the file may be in a bitmap file format where each bit corresponds to a region of a data structure such as a logical unit. When a bit corresponding to a region is set to one, inflight information is to be saved in that corresponding region. When a bit corresponding to a region is set to zero, the corresponding region is clear and does not having any inflight information to be written to it. This coarse grain approach, i.e. each bit corresponding to a region, allows the file or inflight tracker log 152 to be small and stored in cache.

The inflight tracker log 152 may be used by the splitter 127 to retrieve any information that may have been lost during a failure event on a region-by-region basis. For example, the splitter 127 may read the inflight tracker log 152 once a failure event has been resolved and determine information and data that may have been lost "inflight" while being stored the storage devices 114 associated with the primary and secondary clusters. The splitter 127 may then request the clients 102 supplying the lost information and data to resend it to the clustered system. Various embodiments are not limited in this manner.

Similarly, the dirty region log 154 may store dirty region log information indicating information that may be written to regions on storage devices associated with the primary cluster, but not on storage devices associated with the secondary cluster. The dirty region log 154 may also implement and track dirty region information in a bitmap file on a region-by-region basis. Each bit corresponds to a region of a data structure such as a logical unit. When a bit corresponding to a region is set to one, dirty region information is saved in that corresponding region on the primary cluster. When a bit corresponding to a region is set to zero, the corresponding region is in sync on both the primary cluster and secondary cluster.

When a workload is to be replicated on a semi-synchronous basis, the splitter 127 may periodically or semi-periodically read the dirty region log 154, determine regions on the storage devices associated with the primary cluster having unsynchronized information, and perform a replication operation to copy the information from the primary cluster to the secondary cluster. Various embodiments are not limited in this manner, and the dirty region log 154 may also be used during a failure event to ensure that the primary cluster and secondary cluster are in sync by performing a resynchronous operation.

The sync logs 137 may also include a control buffer 156 for use in controlling client traffic processing and client traffic throughput. As previously discussed, the control buffer 156 may be used by the splitter 127 and the file system controller 139-1 to control and adjust the client traffic throughput. For example, the splitter 127 and/or the file system controller 139-1 may store write requests for client traffic and control the output rate of the control buffer 156 for processing the write requests such that that the client traffic throughput is less than or equal to a replication throughput for a particular workload. Various embodiments are not limited in this manner.

Figure 2A:
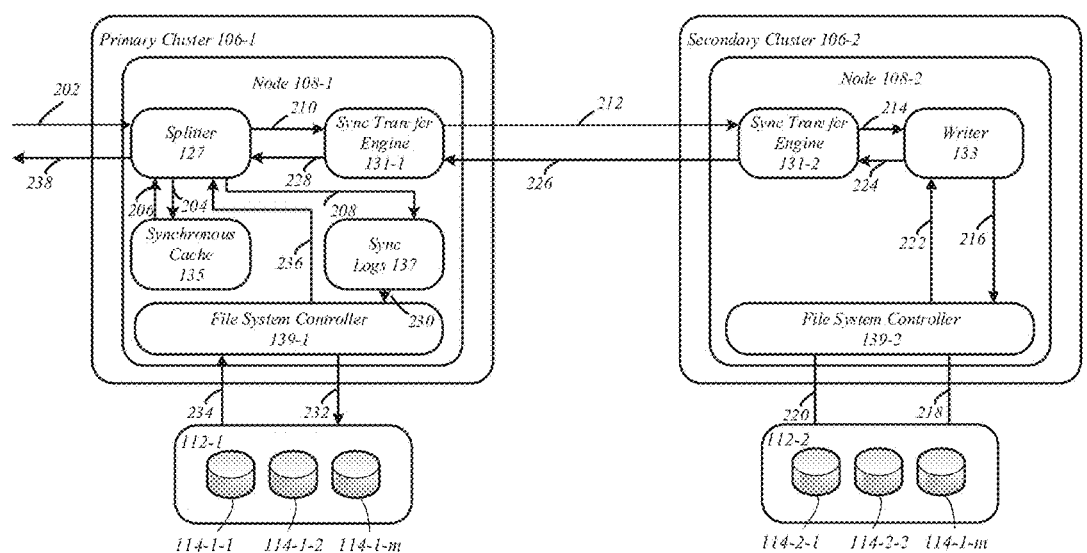
FIG. 2A illustrates an embodiment of a data flow diagram.

FIG. 2A illustrates an embodiment of a data flow diagram 200 for a workload configured with synchronous replication and a splitter 127 controlling client traffic throughput. FIG. 2A illustrates a clustered system, as similarly discussed above with respect to FIGS. 1A-1C. For example, FIG. 2A includes a primary cluster 106-1 including a number of components on a node 108-1 and a secondary cluster 106-2 also including a number of components on a node 108-2. Each of the clusters 106-1 and 106-2 are coupled with storage arrays 112-1 and 112-2, respectively. Further, each of the storage arrays 112-1 and 112-2 may include any number of storage devices 114-1 and 114-2. FIG. 2A also illustrates sync logs 137 which may include the sync logs 137 as illustrated in FIG. 1C, such as an inflight tracker log 152, a dirty region log 154 and a control buffer 156. The clustered system illustrated in FIG. 2A may receive information from any number of devices for any number of workloads to retrieve and a store information.

For example, at line 202 the primary cluster 106-1, and in particular, a splitter 127 may receive information for a workload. The information may include any number of any type of data or information for storage on the clustered system. The splitter 127 may receive the information and determine whether the information is for a workload configured for semi-synchronous or synchronous replication. More specifically, the splitter 127 may retrieve information from a synchronous cache 135 including configuration information for workloads at lines 204 and 206 to determine the configuration for the received information. In this embodiment, the workload is configured for synchronous replication, and thus, the information and a copy or replication of the information is sent for storage on both the primary and secondary storage devices in parallel.

At line 208, the splitter 127 may send the information to a control buffer of the sync logs 137 to control the client traffic throughput and to store information on storage array 112-1. The information including write instructions may be sent as one or more messages, such as file system or WAFL messages. Further, the splitter 127 may utilize the control buffer 156 to ensure that client traffic throughput is less than or equal to the replication throughput. In some embodiments, such as when the client traffic throughput is less than the replication throughput, the splitter 127 may send the information directly to the file system controller 139-1 for storage on the storage array 112-1.

The splitter 127 may also send a copy or replication of the information to the sync transfer engine 131-1 at line 210 at the same time or approximately the same time the information is sent to the control buffer. The sync transfer engine 131-1 may then communicate the information to the secondary cluster 106-2 at line 212. The copy may be sent as one or more packets over a communications link, such as a cluster switching fabric. A sync transfer engine 131-2 on the secondary cluster 106-2 may receive the copy of the information and process the information by sending it to a writer 133 at line 214. The writer may send the copy of the information as one or more file system or WAFL messages to a file system controller 139-2 at line 216.

In embodiments, at line 218 the file system controller 139-2 may communicate the copy of the information to the storage array 112-2 and storage devices 114-2 for storage. The storage array 112-2 may store the copy of the information on the storage devices 114-2 in one or more regions of a data structure, such as a LUN based on information received from the file system controller 139-2. For example, the file system controller 139-2 may include information along with the copy of the information indicating which regions to store the copy in the data structure. Various embodiments are not limited in this manner.

At line 220, the storage array 112-2 and storage devices 114-2 may send a response to the file system controller 139-2 indicating whether the copy has been successfully stored or not. The file system controller 139-2 may then forward the response to the writer 133 at line 222 which then may be communicated back to the primary cluster 106-1 via the sync transfer engine 131-2 at lines 224 and 226.

Similarly, the information may be stored on the storage array 112-1 and storage devices 114-1 associated with the primary cluster 106-1. Although FIG. 2A illustrates certain actions occurring in a certain order, various embodiments are not limited in that manner. For example, the information may be processed and stored on the primary cluster 106-1 simultaneously as the copy is being processed and stored on the secondary cluster 106-2. At line 230, the file system controller 139-1 may receive information as one or more messages, such as file system or WAFL messages from the control buffer. As previously discussed, the splitter 127 may control the rate of output by the control buffer and at which the one or more messages are received by the file system controller 139-1. The rate of output may be controlled such that the client traffic throughput is equal to or less than the replication throughput.

At line 232, the file system controller 139-1 may communicate the information for storage on the storage array 112-1 and storage devices 114-1. The information may be communicated along with other information indicating one or more regions of a data structure to store the information. At line 234, the file system controller 139-1 may receive a response from the storage array 112-1 and storage devices 114-1 indicating whether the information has been successfully stored or not. At line 236 the file system controller 139-1 may communicate the response to the splitter 127. The splitter 127 may send a response to the device at line 238 once it receives the response for the information from the file system controller 139-1 at line 236 and the response for the copy from the sync transfer engine 131-1 at line 228.

Figure 2B:
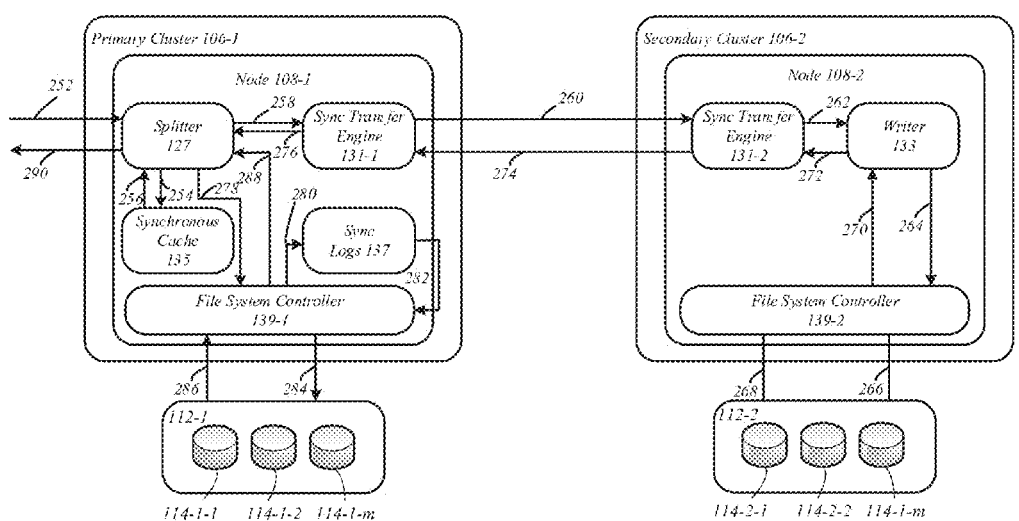
FIG. 2B illustrates a second embodiment of a data flow diagram.

FIG. 2B illustrates an embodiment of a data flow diagram 250 for a workload configured with synchronous replication and a file system controller 139-1 controlling client throughput. FIG. 2B illustrates a clustered system, as similarly discussed above with respect to FIGS. 1A-1C. For example, FIG. 2B includes a primary cluster 106-1 including a number of components on a node 108-1 and a secondary cluster 106-2 also including a number of components on a node 108-2. Further, FIG. 2B also illustrates sync logs 137 which may include sync logs 137 as illustrated in FIG. 1C including an inflight tracker log 152, a dirty region log 154 and a control buffer 156. The clustered system illustrated in FIG. 2B may receive information from any number of devices for any number of workloads to retrieve and a store information.

For example, at line 252 the primary cluster 106-1, and in particular, a splitter 127 on the primary cluster 106-1 may receive information for a workload. The information may include any type of data or information for storage on the clustered system including write instructions. The splitter 127 may receive the information and determine whether the information is for a workload configured for semi-synchronous or synchronous replication. More specifically, the splitter 127 may retrieve information from a synchronous cache 135 including configuration information for workloads at lines 254 and 256 to determine the configuration for the received information. In this embodiment, the received information may be for a workload configured for synchronous replication, and thus, the information and a copy or replication of the information is sent for storage on both the primary and secondary storage devices in parallel.

At line 258, the splitter 127 may send a copy or replication of the information to the sync transfer engine 131-1 at the same time or approximately the same time the information is sent to file system controller 139-1 at line 278 as one or more file system messages or WAFL messages. The sync transfer engine 131-1 may then communicate the information to the secondary cluster 106-2 at line 260. The copy may be sent as one or more packets over a communications link, such as a cluster switching fabric. A sync transfer engine 131-2 on the secondary cluster 106-2 may receive the copy of the information and process the information by sending it to a writer 133 at line 262. The writer may send the copy of the information as one or more file system or WAFL messages to a file system controller 139-2 at line 264.

In embodiments, at line 266 the file system controller 139-2 may communicate the copy of the information to the storage array 112-2 and storage devices 114-2 for storage. The storage array 112-2 may store the copy of the information on the storage devices 114-2 in one or more regions of a data structure, such as a LUN based on information received from the file system controller 139-2. For example, the file system controller 139-2 may include information along with the copy of the information indicating which regions to store the copy in the data structure. Various embodiments are not limited in this manner.

At line 268, the storage array 112-2 and storage devices 114-2 may send a response to the file system controller 139-2 to indicate whether the copy has been successfully stored or not. The file system controller 139-2 may then forward the response to the writer 133 at line 270 which then may be communicated back to the primary cluster 106-1 via the sync transfer engine 131-2 at lines 272 and 274.

In parallel or at approximately the same time, the primary cluster 106-1 may store information for the workload on the storage array 112-1 and storage devices 114-1. As mentioned, the splitter 127 may send the information to the file system controller 139-1 as one or more message, such as file system messages or WAFL messages at line 278. The file system controller 139-1 may receive the information and monitor both the client traffic throughput for the information and the replication throughput for the copy of the information for storage on the secondary cluster 106-2. In some embodiments, the file system controller 139-1 may calculate the client traffic throughput based on the information sent for storage on the storage array 112-1 associated with the primary cluster 106-1. Further, the file system controller 139-1 may determine or receive the replication throughput for the information from the sync transfer engine 131-1 or the synchronous cache 135, as the sync transfer engine 131-1 stores the replication throughput in the synchronous cache 135. The file system controller 139-1 control may compare the client traffic throughput and the replication throughput. If the client traffic throughput is less than or equal to the replication throughput (or the replication throughput is greater than or equal to the client traffic throughput), the file system controller 139-1 may send the information directly to the storage array 112-1 for storage on the one or more storage devices 114-1.

However, at line 280 the file system controller 139-1 may send the information including write operations to a control buffer of the sync logs 137 if the client traffic throughput is greater than the replication throughput. Further, the file system controller 139-1 may control the client traffic throughput by controlling the output rate of the control buffer. For example, and at line 282, the file system controller 139-1 may receive information from the control buffer for storage on the storage array 112-1 at a rate determined by the file system controller 139-1. In other words, the file system controller 139-1 may use a control buffer of the sync logs 137 as temporary storage such that it may control the client traffic throughput.

At line 284, the file system controller 139-1 may send the information for storage to the storage array 112-1. Further, the file system controller 139-1 may receive a response from the storage array 112-1 indicating whether the information has been successfully stored on the storage array 112-1 or not at line 286. At line 288, the file system controller 139-1 may forward or send a response to the splitter 127 indicating whether the information has been successfully stored or not on the storage array 112-1 and storage devices 114-1.

Once the splitter 127 receives responses indicating successful storage the information and a copy of the information, a response may be sent to the device sending the information for storage at line 290. Although FIG. 2A illustrates certain actions occurring in a certain order, various embodiments are not limited in that manner. For example, the information may be processed and stored on the primary cluster 106-1 simultaneously as the copy is being processed and stored on the secondary cluster 106-2. Various embodiments are not limited in that manner.

Figure 3A:
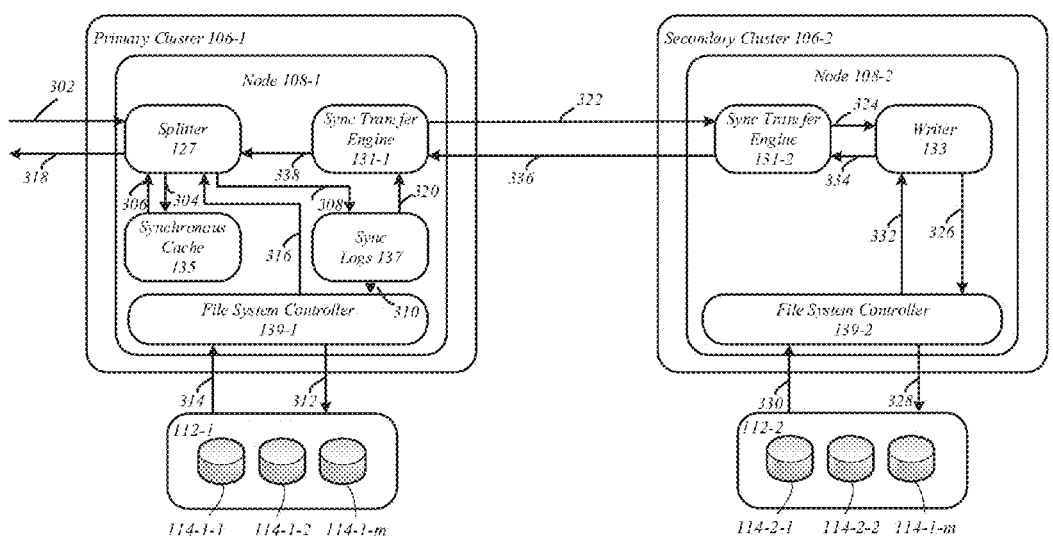
FIG. 3A illustrates a third embodiment of a data flow diagram.

FIG. 3A illustrates an embodiment of a data flow diagram 300 for a workload configured with semi-synchronous replication and a splitter 127 controlling client throughput. FIG. 3A illustrates a clustered system, as similarly discussed above with respect to FIGS. 1A-1C. For example, FIG. 3A includes a primary cluster 106-1 including a number of components on a node 108-1 and a secondary cluster 106-2 also including a number of components a node 108-2. Further, FIG. 3A also illustrates sync logs 137 which may include sync logs 137 as illustrated in FIG. 1C including an inflight tracker log 152, a dirty region log 154 and a control buffer 156. The clustered system illustrated in FIG. 3A may receive information from any number of devices for any number of workloads to retrieve and a store information.

For example, at line 302 the primary cluster 106-1, and in particular, a splitter 127 on the primary cluster 106-1 may receive information for a workload. The information may include any type of data or information for storage on the clustered system including write operations. The splitter 127 may receive the information and determine whether the information is for a workload configured for semi-synchronous or synchronous replication. More specifically, the splitter 127 may retrieve information from a synchronous cache 135 including configuration information for workloads at lines 304 and 306 to determine the configuration for the received information. In this embodiment, the received information may be for a workload configured for semi-synchronous replication. Thus, the information may be stored on storage array 112-1 associated with the primary cluster 106-1. Further, a copy of the information may be sent for storage on storage array 112-2 associated with the secondary cluster 106-2 periodically or semi-periodically. In some embodiments, the copy of the information may be sent to the secondary cluster 106-2 at some later point in time based on a user setting.

As mentioned, the splitter 127 may control the client traffic throughput and may send information to the sync logs 137 for storage on the storage arrays 112-1 and storage devices 114-1. For example, the splitter 127 may send information as one or more file system messages or WAFL messages to a control buffer of the sync logs 137 prior to the received information being stored on storage arrays 112-1 and storage devices 114-1. As previously discussed above with respect to FIG. 2A, the splitter 127 may also monitor client traffic throughput and replication throughput and control the output rate of the control buffer to ensure that the client traffic throughput is less than or equal to the replication throughput. The splitter 127 may also send information to store in a dirty region log of the sync logs 137 for the replication or copy of the information to send to the secondary cluster 106-2. The dirty region log may store information indicating which regions of a data structure on the storages devices 114-1 have information on the primary cluster 106-1 that requires replication on the secondary cluster 106-2.

At line 310, the information for storage on the primary cluster 106-1 may be sent to the file system controller 139-1 from the control buffer as one or more file system or WAFL messages and controlled by the splitter 127. The file system controller 139-1 may then send the information for storage on the storage array 112-1 and storage devices 114-1 at line 312. The storage devices 114-1 may store the information in one or more regions of a data structure, such as a LUN and at line 314 may send a response to the file system controller 139-1 indicating whether the information has been successfully stored or not. Further and at line 316, the file system controller 139-1 may send or forward the response to the splitter 127 indicating whether the information has been successfully stored on the storage array 112-1 and storage devices 114-1 or not. Once the splitter 127 receives the response from the file system controller 139-1, the splitter 127 may send a response to the device sending information for storage at line 318. In this embodiment, the splitter 127 may send the response to the device without receiving a response from the secondary cluster 106-2 since the workload is configured for semi-synchronous replication.

As mentioned, a replication or copy of the information may be sent to the secondary cluster 106-2 at line 322 on a periodic or semi-periodic basis based on a user setting, such as an RPO. In some embodiments, the sync transfer engine 131-1 may receive or retrieve information from the dirty region log at line 320 to determine regions having information for replication on the secondary cluster 106-2. The sync transfer engine 131-1 may retrieve the information for replication and send the information to the sync transfer engine 131-2 at line 322. The sync transfer engine 131-2 on the secondary cluster 106-2 may receive the copy of the information and send it to a writer 133 at line 324 for storage on the storage array 112-2 and storage devices 114-2 associated with the secondary cluster 106-2.

The writer 133 may forward or send the copy of the information for storage as one or more file system or WAFL messages at line 326. Furthermore, the file system controller 139-2 may send the copy of the information to the storage array 112-2 and storage devices 114-2 at line 328. The storage array 112-2 and storage devices 114-2 may store the copy of the information in one or more regions of a data structure, such as a LUN. At line 330, the file system controller 139-2 may receive a response from the storage 112-2 indicating whether the copy of the information has been successfully stored or not.

The file system controller 139-2 may send or forward the response to the sync transfer engine 131-2 via writer 133 at lines 332 and 334. The sync transfer engine 131-2 may send the response to the sync transfer engine 131-1 of the primary cluster 106-1 at line 336 which may forward the response to the splitter 127 at line 338. Although FIG. 3A illustrates certain actions occurring at certain times, various embodiments are not limited in this manner.

Figure 3B:
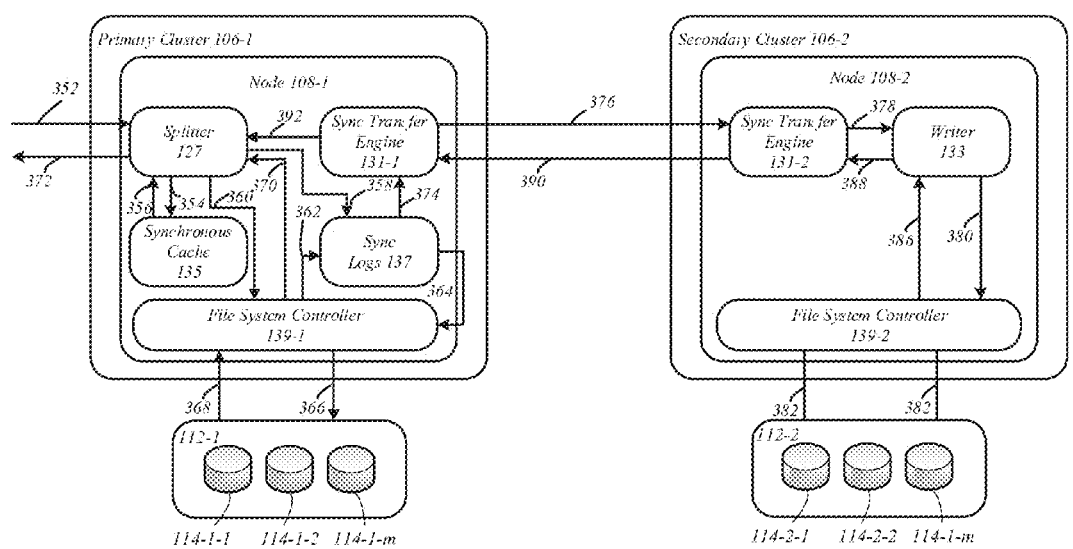
FIG. 3B illustrates a fourth embodiment of a data flow diagram.

FIG. 3B illustrates an embodiment of a data flow diagram 350 for a workload configured with semi-synchronous replication and a file system controller 139-1 controlling client throughput. FIG. 3B illustrates a clustered system, as similarly discussed above with respect to FIGS. 1A-1C. For example, FIG. 3B includes a primary cluster 106-1 including a number of components on a node 108-1 and a secondary cluster 106-2 also including a number of components on a node 108-2. Further, FIG. 3B also illustrates sync logs 137 which may include sync logs 137 as illustrated in FIG. 1C including an inflight tracker log 152, a dirty region log 154 and a control buffer 156. The clustered system illustrated in FIG. 3B may receive information from any number of devices for any number of workloads to retrieve and a store information.

For example, at line 352 the primary cluster 106-1, and in particular, a splitter 127 on the primary cluster 106-1 may receive information for a workload. The information may include any type of data or information for storage on the clustered system including write operations. The splitter 127 may receive the information and determine whether the information is for a workload configured for semi-synchronous or synchronous replication. More specifically, the splitter 127 may retrieve information from a synchronous cache 135 including configuration information for workloads at lines 304 and 306 to determine the configuration for the workload. In this embodiment, the workload may be configured for semi-synchronous replication. Thus, the information may be stored on storage array 112-1 associated with the primary cluster 106-1. Further, a copy of the information may be sent for storage on storage array 112-2 associated with the secondary cluster 106-2 periodically or semi-periodically. In some embodiments, the copy of the information may be sent to the secondary cluster 106-2 at some later point in time based on a user setting.

In embodiments, the file system controller 139-1 may control client traffic throughput. Thus, the splitter 127 may send information for storage directly to the file system controller 139-1 as one or more messages, such as file system or WAFL messages. The file system controller 139-1 may monitor the client traffic throughput and the replication throughput. If the client traffic throughput is less than or equal to the replication throughput, the file system controller 139-1 may send the information for storage directly to the storage array 112-1 and 114-1 for storage at line 366. However, if the client traffic throughput is greater than replication throughput, the file system controller 139-1 may first send the information to a control buffer of the sync logs 137 at line 362 and control the output of the control buffer such that the client traffic throughput is equal to or less than the replication throughput. Moreover, the file system controller 139-1 may control the client traffic throughput using the control buffer by storing the information for the storage in the control buffer and suspending write operations to the storage 112-1 and storage devices 114-1 for a period of time. The file system controller 139-1 may retrieve the information at line 364 and then send the information for storage at line 366 after the expiration of the period of time ensuring that replication throughput is greater than or equal to the client traffic throughput.

At line 368, the file system control 139-1 may receive a response from the storage array 112-1 indicating whether the information has been successfully stored or not. At line 370, the file system controller 139-1 may send the response to the splitter 127 and the splitter 127 may send the response to the device at line 372. Since the workload is configured for semi-synchronous replication, the splitter 127 may send the response to the device without receiving a response from the secondary cluster 106-2.

The splitter 127 may also send information to a dirty region log at line 358 to indicate one or more regions of a data structure on the primary cluster 106-1 having information not replicated on the secondary cluster 106-2. The information may be sent to the dirty region log when information is sent to the file system controller 139-1 at line 362 or at some other time. As previously mentioned, the replication or copy of information may be sent to the secondary cluster 106-2 on a periodic or semi-periodic basis based on a user setting, such as an RPO at line 376. In some embodiments, the sync transfer engine 131-1 may send the copy of the information to the secondary cluster 106-2 based on information received or retrieved from the dirty region log at line 374. As previously mentioned, the dirty region log may indicate one or more regions in a data structure on the storage array 112-1 associated with the primary cluster 106-1 that has information not replicated on the secondary cluster 106-2. The sync transfer engine 131-1 may utilize the dirty region log to send the information to the secondary cluster 106-2.

At line 376, the sync transfer engine 131-2 may receive the copy or replication of the information and forward the copy to the writer 133 at line 378. The writer 133 may then send the copy to the file system controller 139-2 as one or more messages, such as file system or WAFL messages at line 380. The file system controller 139-2 may send the information for storage to the storage array 112-2 and storage devices 114-2 at line 382.

The file system controller 139-2 may receive a response from the storage array 112-2 indicating whether the copy has been successfully stored or not. At lines 386, 388 and 390, the response may be forward and sent to the primary cluster 106-1 via the writer 133 and sync transfer engine 131-2. Further, the response may be sent to the splitter 127 at line 392. Although FIG. 3B illustrates certain actions occurring in a certain order, various embodiments are not limited in this manner and various actions may occur in any order.

Figure 4A:
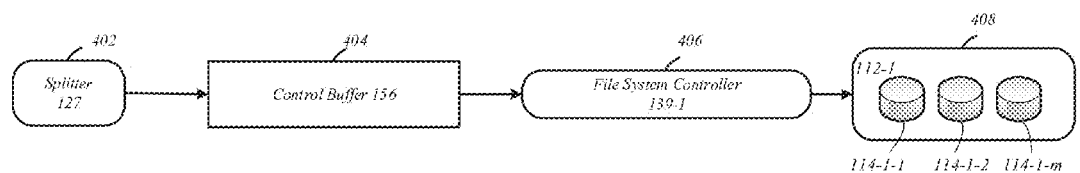
FIG. 4A illustrates a fifth embodiment of a data flow diagram.

FIGS. 4A/4B illustrate embodiments of detailed data flow diagrams 400 and 450 for processing client traffic while sending a replication of the client traffic to a secondary cluster. As mentioned, the client traffic throughput may be controlled such that it is less than or equal to a replication throughput for sending the replication of the client traffic to a secondary cluster. Data flow diagram 400 illustrates the data flow for storing client traffic on a primary cluster controlled by a splitter 127. Data flow diagram 450 illustrates the data flow for storing client traffic on a primary cluster controlled by a file system controller 139-1.

With respect to FIG. 4A, at block 402, the splitter 127 may receive client traffic including information and data from one or more client devices for storage on a clustered system. The client traffic may also include write instructions or operations to store the information and data. The splitter 127 may determine whether the information is for a workload configured for synchronous replication or semi-synchronous replication. Once, the splitter 127 determines the type of replication for the workload, the splitter 127 may send the client traffic for storage on storage devices associated with the primary cluster, and in the case of synchronous replication the splitter 127 may send a replication to a secondary cluster in parallel. As mentioned, for semi-synchronous replication, the client traffic may be replicated at some later point in time.

When the splitter 127 is sending the client traffic it may monitor the client traffic throughput and replication throughput to determine whether the replication throughput is keeping up with the client traffic throughput. As previously discussed, the replication of client traffic on the secondary cluster must keep up with the writing of the client traffic on the primary cluster, or data may be lost if a failure were to occur and/or an RPO may not be met.

At block 404, the splitter 127 may utilize a control buffer 156 to ensure that the client traffic throughput is less than or equal to the replication throughput. For example, the splitter 127 may send the client traffic to the control buffer 156 to temporally throttle the writing of the information to the storage devices 114-1 of the primary storage array 112-1. Moreover, the splitter 127 may control the output rate of the control buffer 156 such that the client traffic throughput is less than or equal to the replication throughput.

The client traffic may be stored in the control buffer 156 as one or more file system messages, which may be sent to the file system controller 139-1 at a rate desired by the splitter 127. The file system controller 139-1 may receive the file system messages including the client traffic for storage on the storage array 112-1 at block 406. Once the file system controller 139-1 receives the client traffic for storage, it may send the client traffic to the storage array 112-1 for storage on one or more storage devices 114-1 at block 408.

Figure 4B:
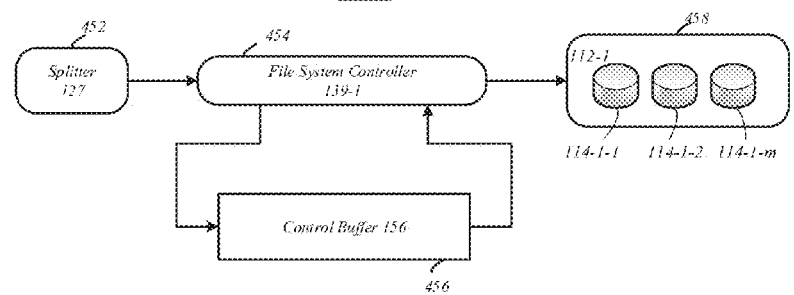
FIG. 4B illustrates a sixth embodiment of a data flow diagram.

FIG. 4B illustrates an example of a data flow diagram 450 where client traffic throughput is controlled by the file system controller 139-1. As similarly discussed above, a splitter 127 may receive client traffic for a workload at block 452. The splitter 127 may determine whether the client traffic is for a workload configured for synchronous replication or semi-synchronous replication. Once, the splitter 127 determines the type of replication for the workload, the splitter 127 may send the information for storage on storage devices associated with the primary cluster, and in the case of synchronous replication the splitter may send a replication of the client traffic to a secondary cluster.

On the primary cluster, a file system controller 139-1 may receive the client traffic as one or more file system messages from the splitter 127 at block 454. The file system controller 139-1 may monitor and control the client traffic for storage on the primary storage array 112-1. More specifically and in one example, the file system controller 139-1 may monitor the client traffic throughput and the replication throughput. When the client traffic throughput is greater than the replication throughput, the file system controller 139-1 may suspend writing the client traffic to the primary storage array 112-1 until the replication throughput catches up to the client traffic throughput. In other words, the file system controller 139-1 may ensure that the client traffic throughput is equal to or less than the replication throughput.

The file system controller 139-1 may send write instructions as file system messages to a control buffer 156 to suspend writing the client traffic to the primary storage arrays at block 456. As similarly discussed above, the file system controller 139-1 may control the output rate of the control buffer 156 to control the client traffic throughput. Once the client traffic has been processed through the control buffer 156, the file system controller 139-1 may send the client traffic for storage on the primary storage array 112-1 at block 458.

Figure 5:
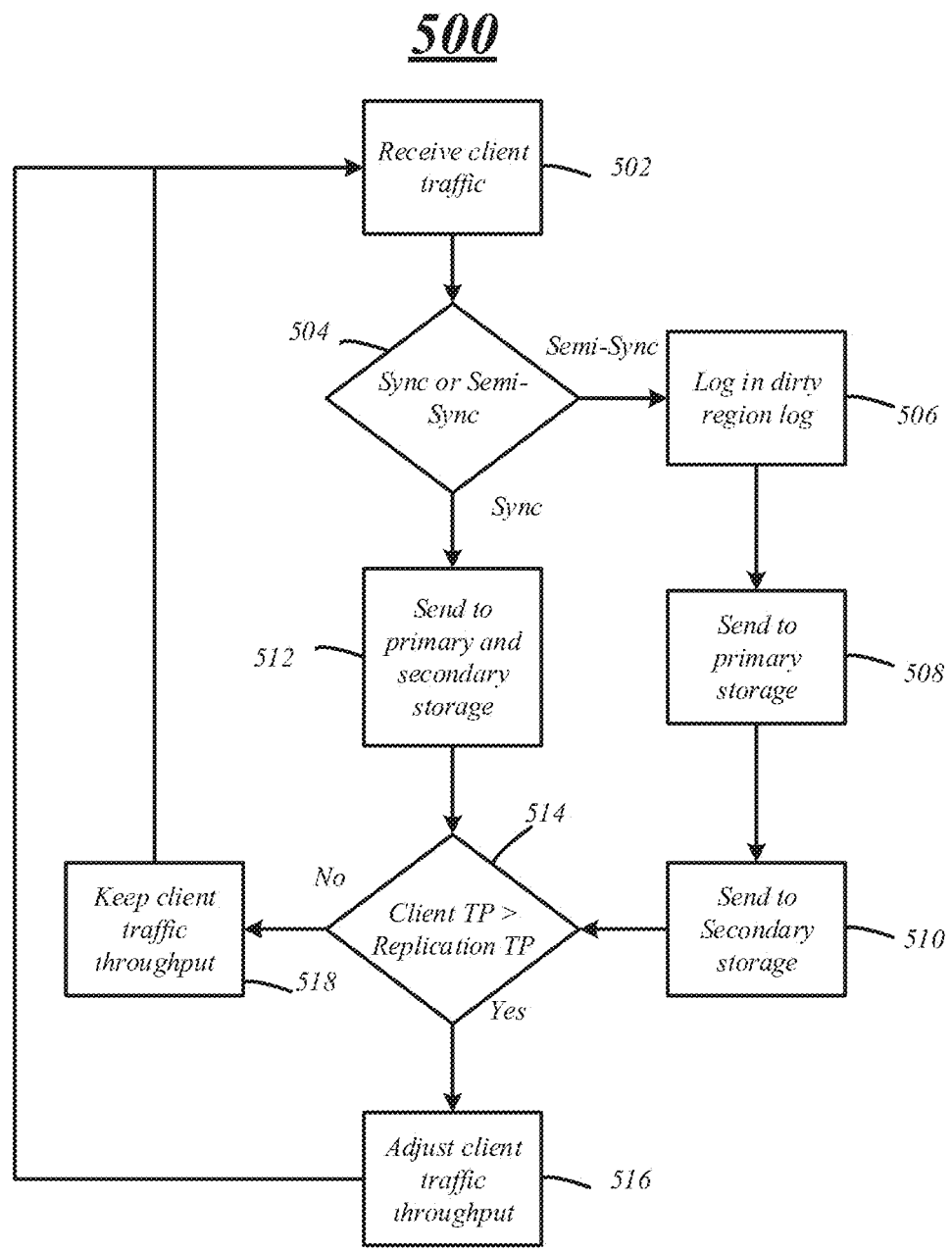
FIG. 5 illustrates an embodiment of a first logic flow diagram.

FIG. 5 illustrates another example embodiment of a logic flow 500 for processing information for workloads by a clustered system, such as the clustered system 100 illustrated in FIGS. 1A-1C. For example, the clustered system may include a primary cluster and a secondary cluster to provide replication and backup capabilities. Further, the clustered system may be configured to replicate information for workloads synchronously or semi-synchronously based on the requirements of a user, administrator or client of the clustered system. Various embodiments are not limited in this manner.

At block 502, the clustered system may receive client traffic including information for storage on the clustered system. For example, a primary cluster of the clustered system may receive information for a workload from a device via one or more communication links. The information may include any type of information and may be received as one or more packets using any protocol for communicating information. The clustered system may determine if the client traffic and information is for a workload configured synchronous replication or semi-synchronous replication at decision block 504. When a workload is configured for synchronous replication, the information received at block 502 may be stored on a primary cluster and a copy or replication of the information may be communicated to a secondary cluster for storage in a synchronous manner at 512. For example, the information may be committed or sent to storage devices associated with the primary cluster and the copy of the information may be committed or sent to storage devices associated with the secondary cluster in parallel during synchronous replication. The information and copy of the information may be communicated to the storage devices as one or more file system or WAFL messages which may be committed to one or more regions residing on the storage devices.

When the workload is determined to be configured for semi-synchronous replication, the information may be stored on storage devices associated with the primary cluster when the information is received from a device. A copy of the information may be sent to the secondary cluster on a periodic or semi-periodic basis based on a user setting. At block 506, one or more regions having the information received from the device may be logged in a dirty region log for use during the replication of the information on the periodic or semi-periodic basis. Further, the information may be sent to the storage devices associated with the primary cluster at block 508. In some embodiments, the information sent to the dirty region log and the information sent to the storage devices may occur at approximately the same time or in parallel. Various embodiments are not limited in this manner.

At block 510, a copy or replication of the information may be sent to the secondary cluster. As previously mentioned, during semi-synchronous replication the copy or replication may be sent to the secondary cluster on a periodic or semi-periodic based on a user setting, such as a RPO. For example, a user may set a RPO, or an acceptable amount of data that may be lost if a failure were to occur, for a workload and the RPO may be used to schedule when a replication operation is to occur. A copy of the information stored on primary cluster since the last replication operation may then be sent to the secondary cluster such that the RPO is met.

For example, the RPO may be set to four minutes, or in other words, a user is willing to lose at most the last four minutes of information communicated to the clustered system. Thus, a replication operation may need to occur every two minutes to satisfy the RPO. In various embodiments, a dirty region log may be used to indicate information that needs to be replicated and to perform the replication at block 510. For example, information in the dirty region log may be used to determine regions of the data structure on the primary cluster having new information, the information may be copied from those regions and sent to the secondary cluster.

At block 514, the client traffic throughput and the replication throughput may be determined and compared by the clustered system. Moreover, the client traffic throughput may be determined when the information is being stored on the primary cluster and the replication throughput may be determined when a copy of the information is being sent and/or stored on a secondary cluster. In some embodiments, when the client traffic throughput is greater than the replication throughput one or more adjustments may be made to the client traffic throughput at block 516. For example, the client traffic processing may be throttled or suspended to ensure that the replication information is being committed to the secondary cluster in a timely manner. In some embodiments, one or more file system messages and/or write operations may be sent to a control buffer to slow down or pause the processing of the information for storage on the primary cluster. The output rate of the control buffer may be controlled such that the client traffic throughput is equal to or less than the replication throughput. When the client traffic throughput is equal to or less than the replication throughput at block 514, the client traffic throughput may be maintained at block 518.

In various blocks 502 through 518 may be repeated any number of times by a clustered system. For example, a clustered system may continue to receive and process information from one or more devices for any number of workloads. Various embodiments are not limited in this manner.

FIG. 6 illustrates an embodiment of logic flow 600. The logic flow 600 may be representative of some or all of the operations executed by one or more embodiments described herein. For example, the logic flow 600 may illustrate operations performed by systems of FIGS. 1A-1D. However, various embodiments are not limited in this manner.

In the illustrated embodiment shown in FIG. 6, the logic flow 600 may include receiving client traffic comprising information at a primary cluster of a clustered system over a communications link. The client traffic may include any type of information for storage on the clustered system, such as data, application information, database information, documents, and so forth. The client traffic may also include write operations instructing the clustered system to store the information. Further, the client traffic may also include read instructions to read information from the clustered system. Various embodiments are not limited in this manner.

The client traffic may be received from one or more client devices and may be for a workload configured on the clustered system. For example, the workload may be a configuration or arrangement a user or service has with the clustered system to store information. The clustered system may be able to support any number of workloads for any number of users, various embodiments are not limited in this manner. In some embodiments, the workloads may be configured such that the client traffic is replicated on the clustered system. For example, as mentioned the client traffic may be received by a primary cluster of the clustered system and a copy of the client traffic may be replicated on a secondary cluster of the clustered system. In some embodiments, the logic flow 600 may include performing a replication operation on the clustered system to replicate the information on the secondary cluster of the clustered system at block 610.

The replication operation may be performed on a synchronous or a semi-synchronous basis for a particular workload. While configured for synchronous replication, the client traffic and the copy of the client traffic is sent for storage on storage devices associated with the primary cluster and the secondary cluster in parallel. Further and for semi-synchronous replication, the client traffic may be sent to storage devices on the primary cluster when it is received by the clustered system, but a copy of the client traffic may be sent for storage on storage devices on the secondary cluster on a periodic or semi-periodic basis determined by a user setting, as previously discussed.

In some embodiments, the logic flow 600 may including determining a client traffic throughput for the client traffic and a replication throughput for the replication operation at block 615. The client traffic throughput may be based on a moving average for processing the client traffic and storing the client traffic on the primary cluster over time. The replication throughput may be based on a moving average for processing the copy of the client traffic and storing the copy on the secondary cluster over time. In various embodiments, the clustered system should maintain the replication throughput at least at the same rate as the client traffic throughput so that a backup or copy of the information is kept in the case of a failure. For synchronous replications, the clustered system may ensure that the replication throughput is equal to or greater than the client traffic throughput while the client traffic and a copy of the client traffic is being processed by the primary and secondary clusters. For semi-synchronous replications, the clustered system may ensure that the replication throughput is equal to or greater than the client traffic throughput and a recovery point objective is being maintained.

At block 620, the logic flow 600 may include buffering one or more write operations to control the client traffic such that the client traffic throughput is less than or equal to the replication throughput for the replication operation. In some embodiments, the client traffic may be controlled by using a buffer to store the write operations in one or more file system messages for the client traffic and controlling the output rate of the buffer to maintain the client throughput at or below the replication throughput. In some embodiments, the client traffic may be controlled by a splitter component on the primary cluster. However, in the same or other embodiments, the client traffic may be controlled by a file system controller on the primary cluster. Various embodiments are not limited in this manner.

Figure 7:
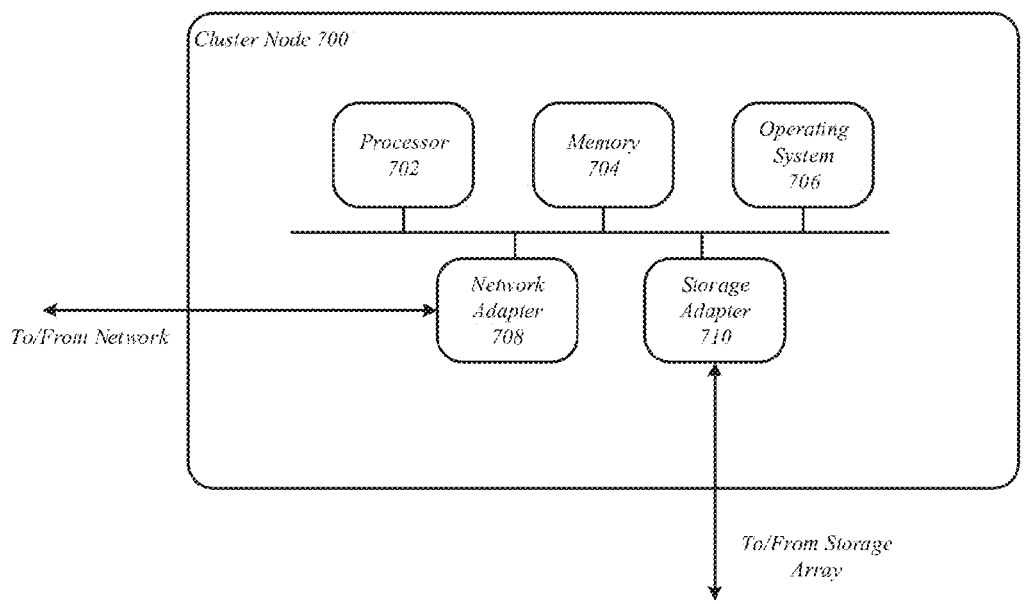
FIG. 7 illustrates an exemplary embodiment of a computing system.

FIG. 7 illustrates an exemplary embodiment of hardware architecture of a cluster node 700. In some embodiments, cluster node 700 may be the same or similar as one of the cluster nodes 108 included in the storage system 100. Cluster node 700 may include processor 702, memory 704, storage operating system 706, network adapter 708 and storage adapter 710. In various embodiments, the components of cluster node 700 may communicate with each other via one or more interconnects, such as one or more traces, buses and/or control lines.

Processor 702 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. In various embodiments, cluster node 700 may include more than one processor.

In one embodiment, cluster node 700 may include a memory unit 704 to couple to processor 702. Memory unit 704 may be coupled to processor 702 via an interconnect, or by a dedicated communications bus between processor 702 and memory unit 704, which may vary as desired for a given implementation. Memory unit 704 may be implemented using any machine-readable or computer-readable media capable of storing data, including both volatile and non-volatile memory. In some embodiments, the machine-readable or computer-readable medium may include a non-transitory computer-readable storage medium, for example. The embodiments are not limited in this context.

The memory unit 704 may store data momentarily, temporarily, or permanently. The memory unit 704 may store instructions and data for cluster node 700. The memory unit 704 may also store temporary variables or other intermediate information while the processor 702 is executing instructions. The memory unit 704 is not limited to storing the above discussed data; the memory unit 704 may store any type of data. In various embodiments, memory 704 may store or include storage operating system 706.

In various embodiments, cluster node 700 may include storage operating system 706 to control storage operations on the cluster node 700. In some embodiments, storage operating system 706 may be stored in memory 704 or any other type of storage device, unit, medium, and so forth. The storage operating system 706 may implement a write-anywhere file system that cooperates with virtualization modules to "virtualize" the storage space provided on the storage arrays and storage devices. The file system may logically organize the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of logical data blocks on the disks that are exported as logical unit numbers (LUNs).

The network adapter 708 may include the mechanical, electrical and signaling circuitry needed to connect the cluster node 700 to one or more hosts and other storage systems over a network, which may include a point-to-point connection or a shared medium, such as a local area network.

In various embodiments, the storage adapter 710 cooperates with the operating system 706 executing on the cluster node 700 to access information requested by a host device, guest device, another storage system and so forth. The information may be stored on any type of attached array of writable storage device media such as video tape, optical, DVD, magnetic tape, bubble memory, electronic random access memory, micro-electro mechanical and any other similar media adapted to store information, including data and parity information. Further, the storage adapter 710 includes input/output (I/O) interface circuitry that couples to the disks over an I/O interconnect arrangement, such as a conventional high-performance, FC serial link topology.

Figure 8:
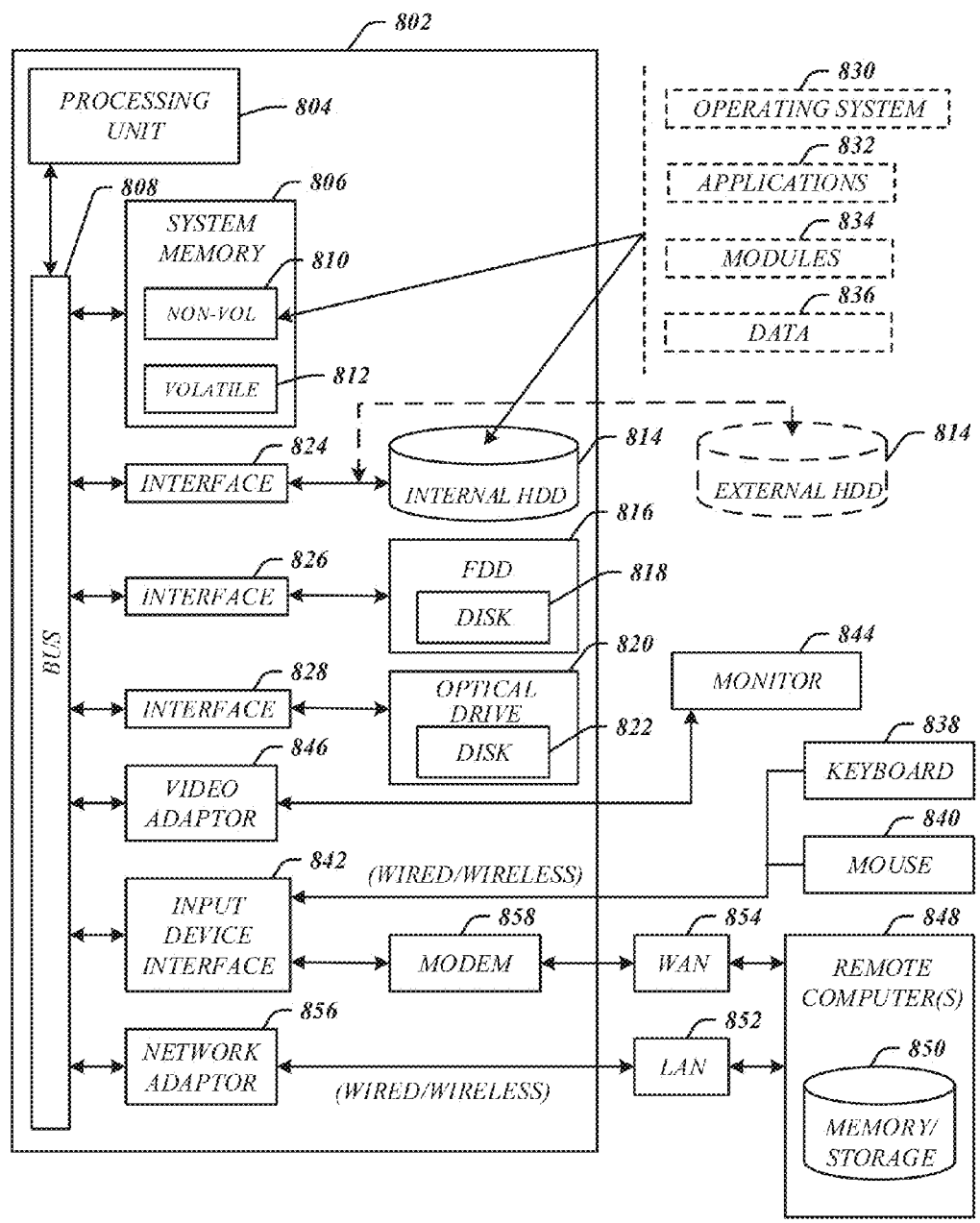
FIG. 8 illustrates an embodiment of a first computing architecture.

FIG. 8 illustrates an embodiment of an exemplary computing architecture 800 suitable for implementing various embodiments as previously described. In one embodiment, the computing architecture 800 may include or be implemented as part of computing system, such as storage systems 100, 125, 150 and 175.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 includes a processing unit 804, a system memory 806 and a system bus 808. The processing unit 804 can be any of various commercially available processors.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the system 100.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the communication links shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the storage system 100, 125, 150, and 175 as previously described with reference to FIGS. 1-8 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A method, comprising:
    receiving client traffic, comprising a write request, at a first cluster;
    creating an entry within an inflight tracker log of the write request, wherein a first value is written to the entry based upon data of the write request being stored to the first cluster and not a second cluster, a second value is written to the entry based upon the data being stored to the second cluster and not the first cluster, and a third value is written to the entry based upon the data not being stored to the first cluster and not being stored to the second cluster, wherein a fourth value is written to the entry based upon the data being stored to both the first cluster and the second cluster;
    implementing the write request upon storage of the first cluster;
    creating a dirty entry within a dirty region log indicating that the write request has modified a region of the storage of the first cluster that has not yet been replicated to the second cluster;
    performing a replication operation of the write request to the second cluster based upon the inflight tracker log and the dirty region log;
    determining a client traffic throughput for the client traffic and a replication throughput for the replication operation; and
    buffering one or more write operations, logged by the inflight tracker log and tracked by the dirty region log, to control the client traffic such that the client traffic throughput is less than or equal to the replication throughput.

2. The method of claim 1, comprising:
    clearing the entry based upon the write request and the replication operation successfully completing.

3. The method of claim 1, comprising:
    clearing the dirty entry based upon the replication operation successfully completing.

4. The method of claim 1, comprising:
    scheduling performance of the replication operation based upon a recovery point objective metric.

5. The method of claim 4, comprising:
    specifying performance of replication operations at a frequency that is a fraction of a recovery time parameter specified by the recovery point objective metric.

6. The method of claim 5, wherein the recovery time parameter specifies an amount of time for which a user is willing to lose information communicated to the first cluster.

7. The method of claim 5, wherein the frequency is specified as one half of the recovery time parameter.

8. The method of claim 1, comprising:
    implementing a resynchronization of the client traffic between the first cluster and the second cluster;

evaluating the inflight tracker log and the dirty region log to determine that the data of the write request has not been replicated to the second cluster; and performing the replication operation as part of the resynchronization.

9. The method of claim 1, comprising:

storing the replication throughput into a synchronous cache.

10. The method of claim 1, wherein the inflight tracker log comprises a bitmap, wherein a bit of the bitmap corresponds to a region of a data structure of the first cluster.

11. The method of claim 10, comprising:

saving inflight information into the region based upon the bit being set to the first value, the second value, or the third value.

12. The method of claim 11, comprising:

setting the bit to the fourth value to indicate that the region is clear of inflight information.

13. The method of claim 1, wherein the dirty region log comprises a bitmap, wherein a bit of the bitmap corresponds to a region of a storage device of the first cluster.

14. The method of claim 13, comprising:

setting the bit to a first bit value to indicate that the region comprises data not yet replicated to the second cluster.

15. The method of claim 14, comprising:

setting the bit to a second bit value upon the data being replicated to the second region.

16. The method of claim 1, wherein the buffering comprises:

selectively buffering write operations but not read operations of the client traffic.

17. A non-transitory machine readable medium comprising instructions for performing a method, which when executed by a machine, causes the machine to:

receive client traffic, comprising a write request, at a first cluster;

create an entry within an inflight tracker log of the write request, wherein a first value is written to the entry based upon data of the write request being stored to the first cluster and not a second cluster, a second value is written to the entry based upon the data being stored to the second cluster and not the first cluster, and a third value is written to the entry based upon the data not being stored to the first cluster and not being stored to the second cluster, wherein a fourth value is written to the entry based upon the data being stored to both the first cluster and the second cluster;

implement the write request upon storage of the first cluster;

create a dirty entry within a dirty region log indicating that the write request has modified a region of the storage of the first cluster that has not yet been replicated to the second cluster;

perform a replication operation of the write request to the second cluster based upon the inflight tracker log and the dirty region log;

determine a client traffic throughput for the client traffic and a replication throughput for the replication operation; and buffer one or more write operations, logged by the inflight tracker log and tracked by the dirty region log, to control the client traffic such that the client traffic throughput is less than or equal to the replication throughput.

18. The non-transitory machine readable medium of claim 17, wherein the instructions cause the machine to:

schedule performance of the replication operation based upon a recovery point objective metric.

19. The non-transitory machine readable medium of claim 18, wherein the instructions cause the machine to:

specify performance of replication operations at a frequency that is one half of a recovery time parameter specified by the recovery point objective metric.

20. A computing device comprising:

a memory containing instructions for performing a method; and a processor coupled to the memory, the processor configured to execute the instructions to cause the processor to:

receive client traffic, comprising a write request, at a first cluster;

create an entry within an inflight tracker log of the write request, wherein a first value is written to the entry based upon data of the write request being stored to the first cluster and not a second cluster, a second value is written to the entry based upon the data being stored to the second cluster and not the first cluster, and a third value is written to the entry based upon the data not being stored to the first cluster and not being stored to the second cluster, wherein a fourth value is written to the entry based upon the data being stored to both the first cluster and the second cluster;

implement the write request upon storage of the first cluster;

create a dirty entry within a dirty region log indicating that the write request has modified a region of the storage of the first cluster that has not yet been replicated to the second cluster;

perform a replication operation of the write request to the second cluster based upon the inflight tracker log and the dirty region log;

determine a client traffic throughput for the client traffic and a replication throughput for the replication operation; and buffer one or more write operations, logged by the inflight tracker log and tracked by the dirty region log, to control the client traffic such that the client traffic throughput is less than or equal to the replication throughput.

\* \* \* \* \*